United States Patent [19]

Niehaus et al.

[11] Patent Number: 4,702,660

[45] Date of Patent: Oct. 27, 1987

[54] METHOD AND APPARATUS FOR STORING AND HANDLING TRAYS FOR WORKPIECES

[75] Inventors: Gerald Niehaus; Ernest Bivens, both of Evansville, Ind.

[73] Assignee: Evana Tool & Engineering Inc., Evansville, Ind.

[21] Appl. No.: 796,770

[22] Filed: Nov. 12, 1985

[51] Int. Cl.$^4$ .............................................. B65G 60/00
[52] U.S. Cl. ...................................... 414/95; 221/297; 414/37; 414/127; 414/786
[58] Field of Search ................. 414/95, 127, 222, 331, 414/37, 786; 221/251, 297, 298

[56] References Cited

U.S. PATENT DOCUMENTS

| | | | |
|---|---|---|---|
| 3,308,977 | 3/1967 | Cochran et al. | 414/222 |
| 3,757,971 | 9/1973 | Frish | 414/127 |
| 4,015,732 | 4/1977 | Beaty, Jr. et al. | 414/62 X |
| 4,036,381 | 7/1977 | Nielsen et al. | 414/222 X |
| 4,043,460 | 8/1977 | Steele | 414/95 |
| 4,352,617 | 10/1982 | Sakai et al. | 414/95 |

Primary Examiner—Joseph E. Valenza
Assistant Examiner—Janice Krizek
Attorney, Agent, or Firm—Larson and Taylor

[57] ABSTRACT

The invention relates to an apparatus and method for handling and storing a plurality of workpieces on trays. A storage rack is provided and a plurality of trays may be stored in vertical stacked relationship. A trackway is provided for transferring trays into and from the storage rack and transfer mechanism is provided for transferring simultaneously a plurality of workpieces to or from individual rows on the trays. Rotatable support arms are engageable with the vertically stacked trays to support the trays above the lowermost tray so that the lowermost tray can slide into or out of the storage rack. The support arms move into operative or inoperative position when the lowermost tray is in a partially withdrawn position.

5 Claims, 6 Drawing Figures

METHOD AND APPARATUS FOR STORING AND HANDLING TRAYS FOR WORKPIECES

BACKGROUND OF THE INVENTION

This invention relates to a method and apparatus for handling small workpieces, for storing such workpieces on trays and for transferring the workpieces for further operations or assembly.

It is common practice in large manufacturing plants to provide part transfer devices which are adapted to receive individual parts undergoing various manufacturing processes and to transfer these parts to other machines for subsequent operations or for purposes of assembly into operative devices. Obviously the speed and handling of the parts is a primary consideration as is the necessity for accuracy in locating and handling of the parts so as to avoid any malfunction of the machines.

More specifically, in the assembly of gasoline gauges for automobiles it is essential to provide trays for supporting a plurality of individual parts, such as, for example, the magnetic gauge bobbin. These gauges must be magnetized to operate and must then be stored for subsequent transfer to work stations for assembling the individual fuel gauges. The present invention provides trays for retaining in precise locations a large number of individual gauge bobbins and for moving these trays into and out of storage racks which are capable of storing a large number of such trays.

In the prior art there have been provided various transfer devices for feeding individual parts into and out of storage containers. In prior U.S. Pat. No. 3,710,958, issued Jan. 16, 1973 there is disclosed a rotary stand having a plurality of vertically extending guideways, each guideway being adapted to receive a cartridge for holding a plurality of individual parts such as circuit boards. Such an arrangement has been entirely satisfactory for the handling of circuit boards but did not meet the needs of handling simultaneously a large number of very small parts.

SUMMARY OF THE INVENTION

According to the present invention there is provided a storage rack which is adapted to receive in vertically stacked relationship a plurality of trays. Each tray has multiple rows of sets of workpiece receiving cavities. A transfer mechanism is provided for simultaneously transferring a plurality of workpieces to and from each row of cavities on the tray. Indexing means is provided for the tray for moving the tray along a trackway so that the rows are sequentially presented to the transfer mechanism for loading or unloading the workpieces.

The storage rack includes a frame for retaining the trays in vertically stacked relationship. Two pairs of rotatable arms are disposed adjacent the lower outer sides of the rack and these arms are rotatable from a raised position wherein they support a tray to a lowered inoperative position. Each tray is provided with side flanges which are engaged by the rotatable arms when the arms are in operative position. The side flanges have cut out portions which permit the arms to rotate to a lower inoperative position. The rotatable arms support the lowermost tray in a stack sufficiently above the bottom surface of the storage rack to permit a tray to be indexed into or out of the storage rack beneath the supported tray. When the tray moving into or out of the storage rack is indexed to a predetermined position, the rotatable arms move to an inoperative position and the arms pass through cut out portions in the side flanges of the tray being indexed.

The mechanism of the tray handles provides for precise indexing so that parts may be exactly located on trays in an orientation that they can be readily located by transfer mechanisms after they have been removed from storage on the trays. The construction of the storage rack permits storage trays to be added or removed from the system without stopping the transfer mechanism.

An object of the present invention is to provide a parts transfer and storage unit which permits a plurality of workpieces to be transferred simultaneously to or from trays which index along a trackway to and from a storage rack.

A further object of the invention is to provide a storage rack for storing a plurality of individual trays by indexing the trays into and out of the storage rack on a trackway while retaining the stacked trays a sufficiently spaced distance above the trackway to permit the lowermost tray to move into or out of stacked position.

Other objects and many of the attendant advantages of the present invention will become apparent upon consideration of the following detailed description in connection with the accompanying drawings wherein.

Figure 1:
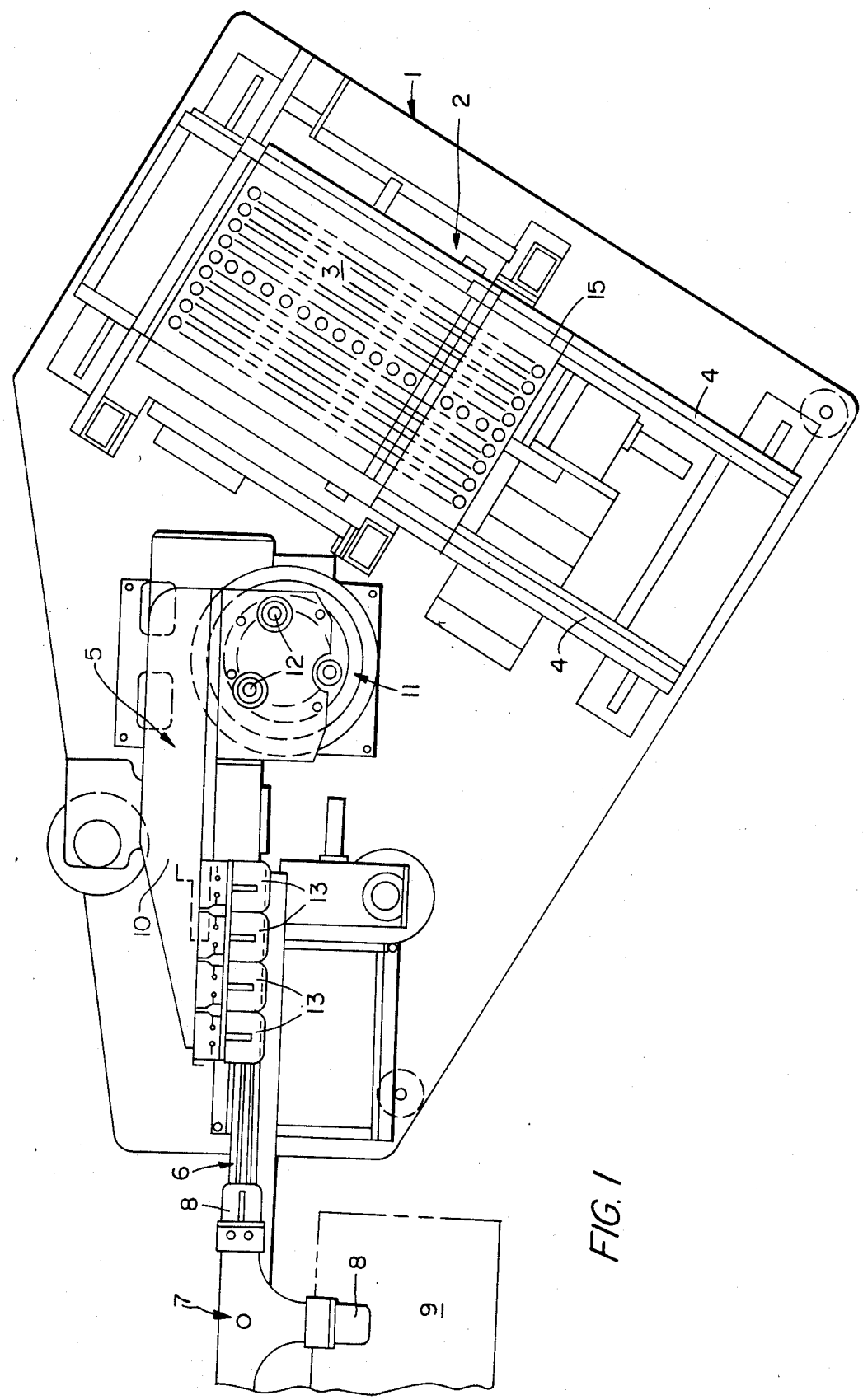
FIG. 1 is a top plan view of the storage rack, trackway and transfer mechanism.

Referring now more specifically to the drawings wherein like numerals refer to like parts throughout the several views there is shown at 1 in FIG. 1 a platform which serves to support a storage rack 2 which is adapted to return a plurality of trays 3 in vertically stacked relationship. Extending outwardly from the storage rack and mounted on the platform 1 are a pair of tracks 4 which serve to guide the trays into and out of the storage rack.

A transfer mechanism shown generally at 5 is also mounted on platform 1 and this mechanism is designed to pick up and deliver a plurality of workpieces to the trays 3 for storage of the workpieces in the storage rack 2. When the workpieces are to be used in a subsequent assembly operation this same transfer mechanism or alternatively a similar transfer mechanism may be used to pick up the workpieces from the trays as they are indexed out of the storage rack and deliver the workpieces to a conveyor for subsequent assembly operations.

In the embodiment shown the transfer mechanism 5 is used to pick up a plurality of parts from a conveyer 6 such as, for example, a walking beam type of conveyor which is well known in the art. The conveyor 6 receives the individual work parts from a rotatary multi-armed carrier 7 having part engaging heads 8 at the end of each arm. The rotary carrier 7 delivers the parts sequentially to various workstations such as shown at 9 and the completed workpiece is delivered to the walking beam conveyor 6 so that a plurality of workpieces are aligned on the conveyor.

Figure 2:
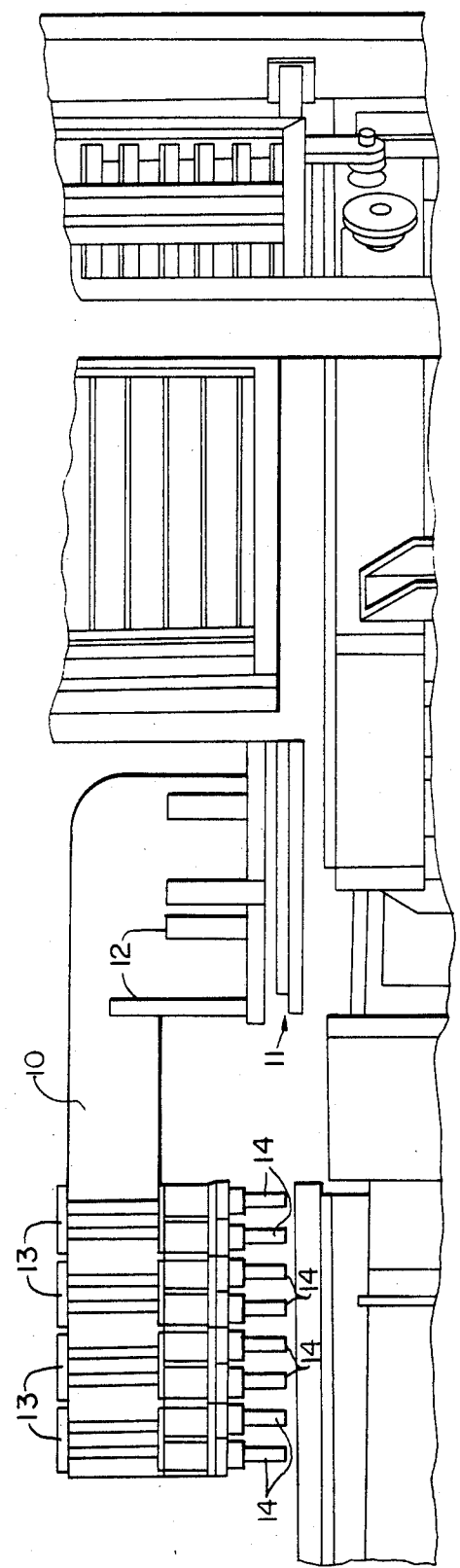
FIG. 2 is a vertical perspective view of the mechanisms shown in FIG. 1.

The transfer mechanism 5 comprises an arm 10 which is mounted on a central head 11 on a plurality of pins 12 which support the arm for vertical and rotary movement. The particular mechanism for moving the arm 10 vertically and rotating the arm forms no part of the present invention and any conventional mechanism may be used. The outer end of the arm is provided with four part engaging heads shown generally at 13. As seen in FIG. 2 each of the heads 13 includes two pairs of clamping means 14 so that, in the embodiment shown, the arm 10 may pick up eight workpieces from the walking beam conveyor 6. After engaging the workpieces with clamping elements 14, the arm 10 is raised and rotated to a position where the workpieces are delivered to a tray indexing into the storage rack, such as, as seen in FIG. 1, the tray 15.

Figure 4:
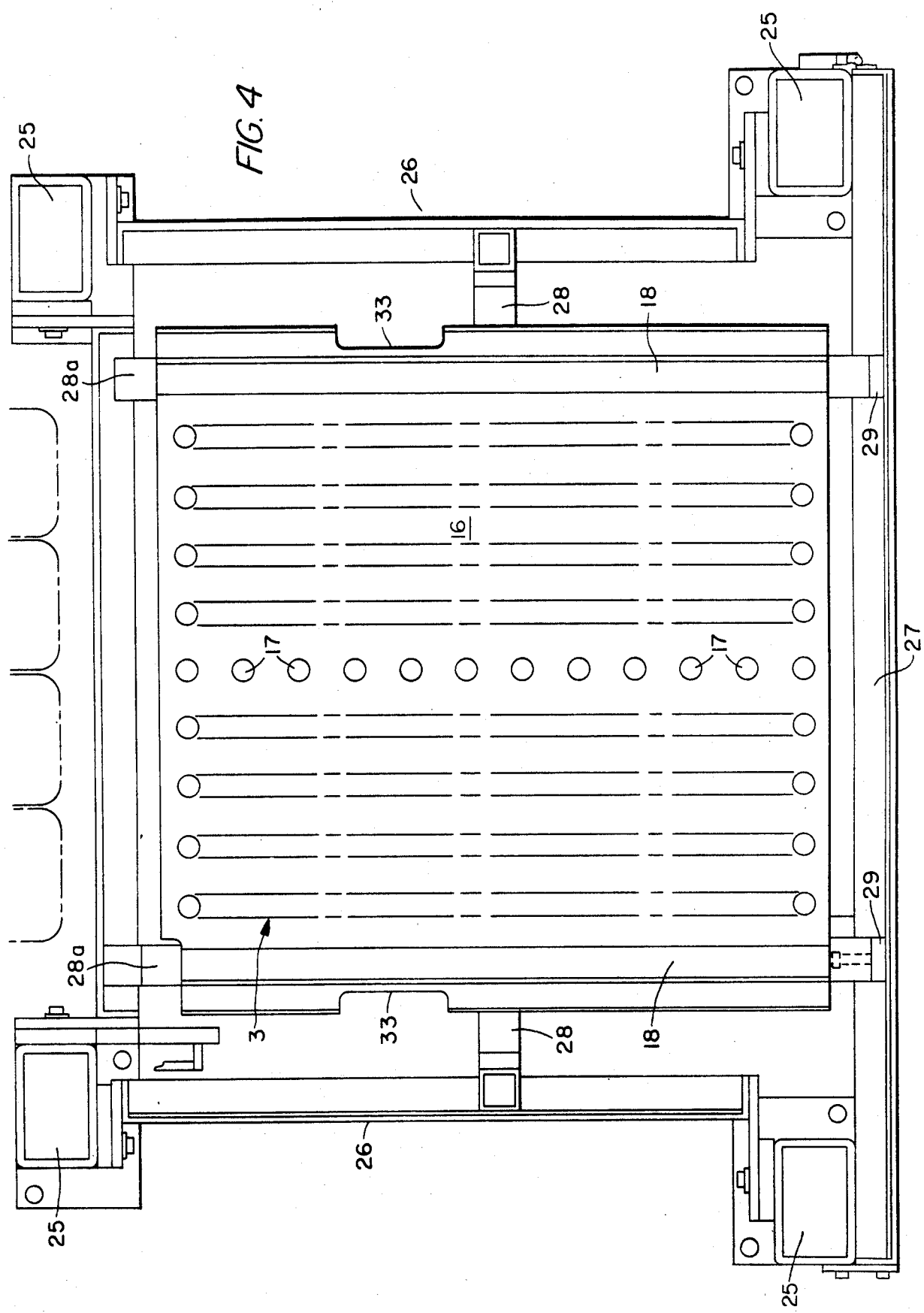
FIG. 4 is a top plan view of the storage rack with a tray therein.

Each storage tray 3 comprises a plate 16 having a plurality of centrally aligned index holes 17 therein as shown in FIG. 4. A pair of spacer bars 18 are afixed to the upper surface of the plate inwardly of the outer edges of the plate. A pair of guide rails 19 are secured to the lower surface of the plate 16 along the side edges of the plate as shown in FIG. 5.

Each storage tray is provided with retaining means (not shown) on the upper surface of plate 16 for retaining workpieces. These retaining means may be in the form of a series of apertures, recesses or abutments to receive the workpieces delivered by the transfer mechanism. The retaining means are aligned in rows across the upper face of the plate 16 so that, in the embodiment shown, the transfer mechanism delivers eight workpieces which are received in retaining means, four on each side of the index hole. The storage tray moves one fixed distance to position the next line of retaining means to receive workpieces from the transfer mechanism.

Figure 5:
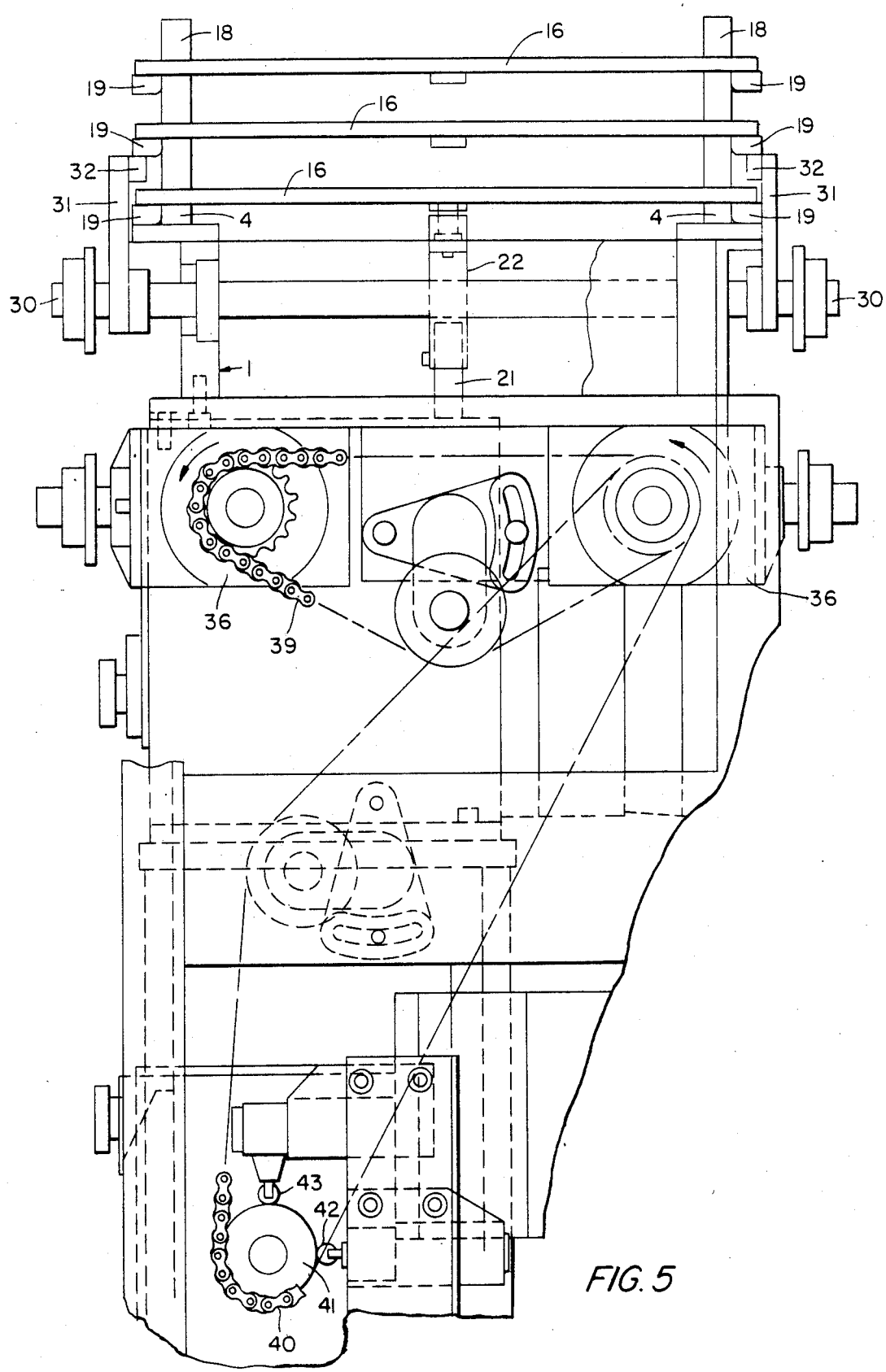
FIG. 5 is a front elevation of the storage rack and trays showing the drive mechanism for the support arms.

The spacer bars 18 are of sufficient height to permit the storage trays 3 to be vertically stacked as seen in FIG. 5 with the workpieces in place on plates 16. Obviously in order to provide maximum storage capability within a single rack the height of the spacer bar 18 is the minimum required for the particular workpiece being stored.

As seen in FIG. 5 the lowermost trays has the lower surface of plate 16 resting on the upper face of the tracks 4. The inner faces of guide rails 19 are in close fitting relationship with the outer faces of the tracks 4 so that the tray is prevented from moving in a sideways direction and moves along the guide rails in a straight line. This structure in combination with the indexing means to be described hereinafter assures precise positioning of the storage tray for receiving and delivery of workpieces to the transfer mechanism.

Figure 3:
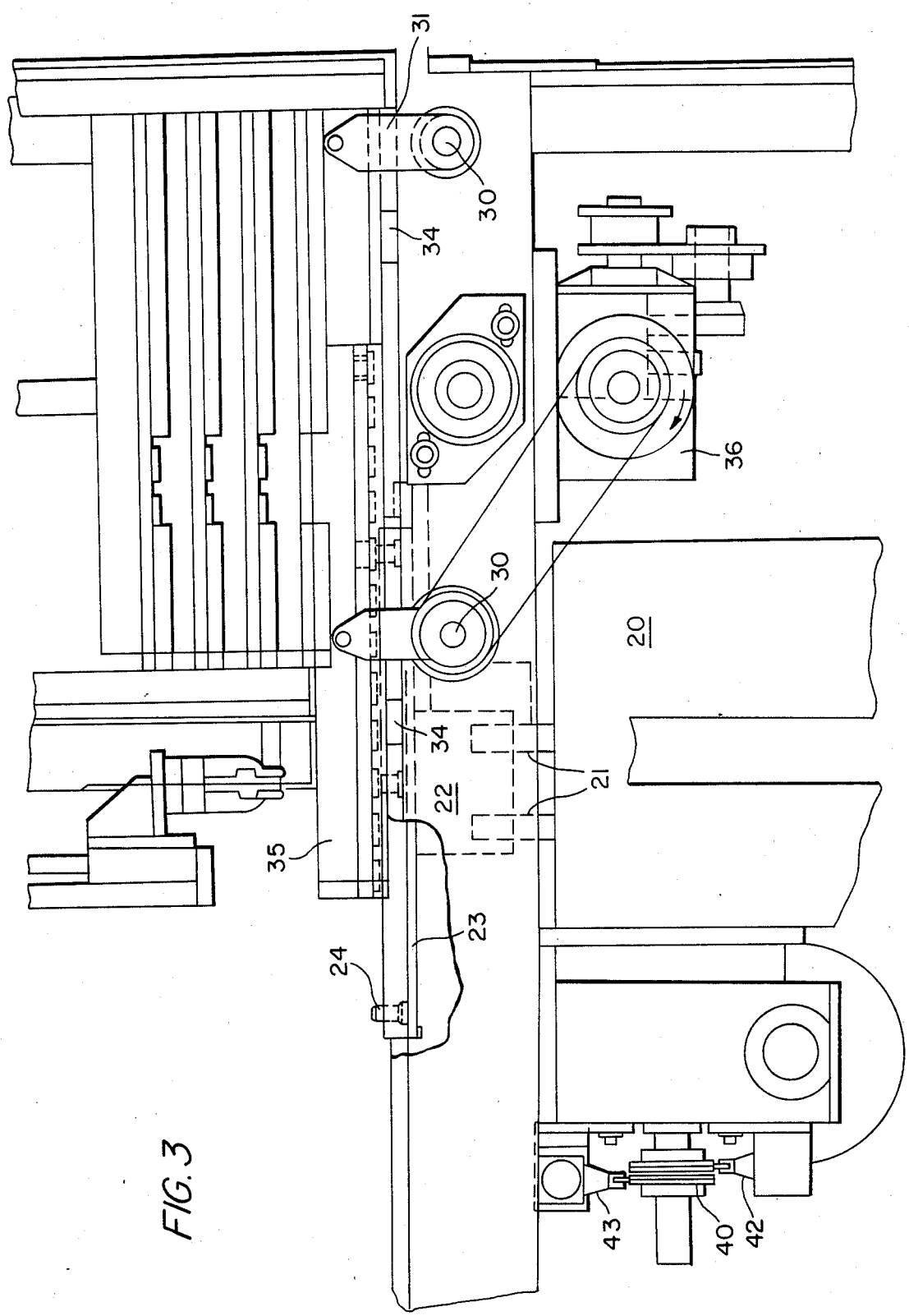
FIG. 3 is a side elevation partly in section showing the storage rack with trays therein.

The mechanism for moving the storage trays 3 along the tracks 4 into and out of the storage rack comprises a Stelron unit 20 as shown generally in FIG. 3. This unit is of a well known design operating on a barrel cam and causing the output pins 21 to be driven in a fixed rectangular motion, that is, upwardly a fixed distance, horizontally then downwardly and returning to its original position. As shown the pins 21 and fixed within a block 22 which is in turn fixed to a longitudinally extending bar 23 having three shot holding pins extending upwardly therefrom. As shown two of the shot holding pins 24 are in engagement with index holes 17 in the plate 16 of the tray 3. In the position shown in FIG. 3, the Stelron unit 20 has output pins 21 in the upper position so as to drive the storage tray horizontally a fixed distance along the tracks 4 and subsequently the drive unit 20 will lower pins 21 to disengage the shot holding pins 24 from the index holes 17 in the tray. The output pins will then move horizontally the same fixed distance to be raised and engage the next index holes. As noted hereinbefore, this particular drive means in combination with the tray support means assures precise positioning of the trays so as to permit transfer of workpieces to and from the trays by the transfer mechanism.

The storage rack 2 comprises as shown in FIG. 4 four vertically extending corner posts 25 which are fixedly mounted on platform 1. Side walls 26 and a rear wall 27 complete the frame for housing the stacked trays. Secured within sidewalls 26 are vertically extending retaining guideplates 28 which engage the sides of the vertically stacked trays and prevent misalignment of the trays. Disposed at the front of the storage rack are vertically extending guideplates 28a as seen in FIG. 4. These plates extend downwardly from the top of the rack but terminate sufficiently above the tracks 4 to permit the lowermost tray to move in and out of the stack. There are also provided stop plates 29 which engage the rear surface of the tray to maintain the precise orientation of the vertically stacked trays.

The mechanism for raising the stacked trays to permit a tray to move into the lower end of the stack and to lower the stack when a tray moves out from the bottom of the stack is of particular signficance to the present invention. There are provided a pair of shafts 30 (FIGS. 3 and 6) which are rotatably mounted within the platform beneath the storage rack. At the outer end of each shaft is fixedly mounted a cam arm 31. The outer ends of the cam arms 31 have cam rollers 32 extending inwardly from the arms. The cam rollers 32 are positioned as shown in FIG. 5 to engage the underside of the guide rails 19 on the trays 3. Drive means to be described hereinafter is provided to rotate both shafts 32 simultaneously from the upper position shown wherein the cam rollers 32 engage the guide rails 19 to a lower inoperative position. Referring to FIG. 4 it can be seen that the trays have cut out portions 33 both on each side of plate 16 and in supporting guide rail 19. These cut outs permit the cam rollers 32 to rotate around the sides of a tray to their operative and inoperative positions. There are also cut out portions 34 in the trackway to permit rotation of the cam arms and cam rollers.

The sequence of operation of the cam arms 31 is as follows. In the position shown in FIG. 3 the cam arms 31 and rollers support the vertically stacked trays above tray 35 so that there is a slight clearance between the upper surface of the spacer bars 18 on tray 35 and the lower face of plate 16 of the lowermost stacked trays. Thus, in this position the tray 35 may be indexed into or out of the stack without the weight of the stacked trays on tray 35. Assuming tray 35 is moving into the storage rack, the cam arms remain in their operative position until tray 35 indexes into the storage rack and tray 35 is positioned so that forward shaft 30 may rotate to an inoperative position and the rear edge of the tray 35 still does not block the rear cut out 34 in track 4 so that the rear shaft 30 may rotate counterclockwise as seen in FIG. 3 through slot 34 to an inoperative position. Simultaneously forward shaft 30 rotates clockwise to permit rollers 32 to pass through cut outs 33 in tray 35 and through forward cut out 34 in track 4. The weight of the stacked trays is then carried by tray 35 as the tray 35 indexes into its final position in the rack. To receive a further tray into the stack the forward arm is rotated counterclockwise and the rearward arm clockwise to bring the arms upwardly so that the cam rollers 32 engage the lower surfaces of guide rails 19 and raise the stacked trays.

When the trays are to be removed from the stack, the lowermost tray is indexed out bearing the weight of the stacked trays until it is in a partially displaced position so that the rear of the tray is clear of the rear cut outs in track 4 and the cut outs 33 in the tray moving out of the stack is in alignment with the forward cut outs 34 in track 4. In this position the forward and rearward arms 31 may be rotated clockwise and counterclockwise respectively to engage the guide rails on the tray above the tray being removed to raise the stack of trays and permit complete removal of the tray from the stack.

Figure 6:
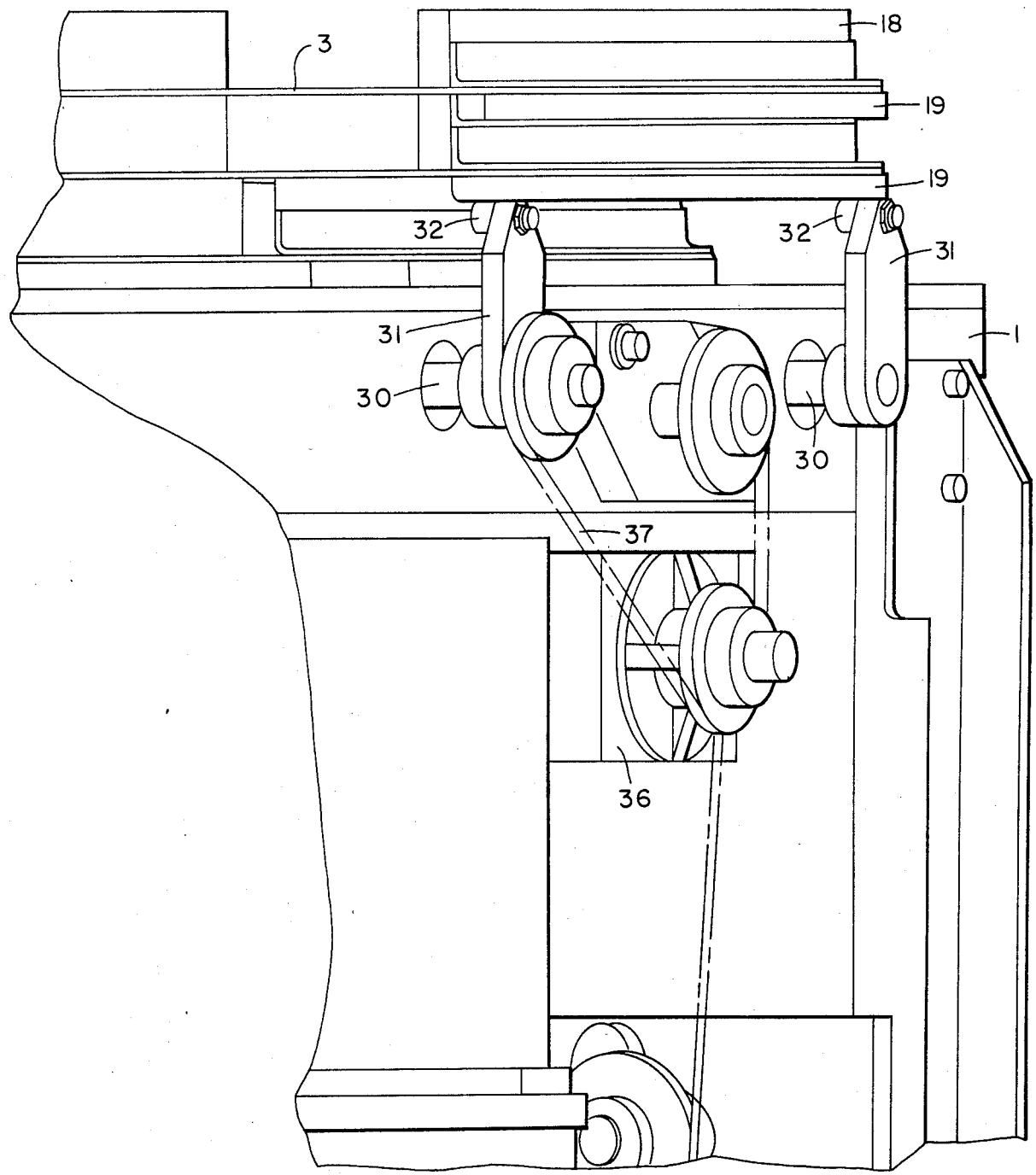
FIG. 6 is a vertical perspective view of the support arms and stacked trays.

The drive means for driving the shafts 30 and cam arms 31 is shown in FIGS. 3, 5 and 6. A motor drives a pair of gear reducers 36, FIGS. 3 and 6 each of which drives one of the shafts 30, the forward shaft 30 being driven by belt 37 in a clockwise direction and the rearward shaft 30 being driven by the gear reducer 36 on the opposite side by a belt. As seen in FIG. 5 the two gear reducers 36 are connected by means of a chain 39 so that the shafts are driven synchronously. A chain drive 40 is also provided to a cam 41 having followers 42 and 43 to activate and deactivate the Stelron unit 20 so that the movement of output pins 21 are synchronized with the movement of the cam arms 31.

It can be seen that by virtue of the presently disclosed tray handling system means is provided for transferring a plurality of workpieces from a conveyor onto a plurality of trays and for indexing the filled trays into a storage rack. Cam arms are provided for raising the stacked trays for permitting the tray being moved into the stack to enter at the lower end. When the stacked trays are to be moved out of the storage rack the lowermost tray is moved out along the trackway to a position where the cam arms can move into an operative position to support the stack of trays and provide clearance so that the lowermost tray can move completely out of the storage rack.

Obviously many modifications and variations of the present invention are possible in light of the foregoing teachings.

What is claimed as new and is desired to be secured by Letters Patent is:

1. A tray handling system for storing work parts comprising a plurality of multiple cavity trays, a storage rack for retaining said trays in stacked relationship, a trackway extending outwardly from one side of the lower end of said storage rack, means for indexing a tray along said trackway into sequential operative positions to receive workparts into the multiple cavities on said tray or deliver workparts from the multiple cavities and means for moving said trays sequentially into and out of stacked relationship within said storage rack, said means for moving said trays into and out of stacked relationship comprising a pair of support arms disposed at each end of said storage rack, tray engaging means on the ends of said support arms, means for simultaneously rotating said pairs of support arms, flanges extending outwardly on each side of said trays for engagement with said tray engaging means on said support arms, cut out portions in said flanges intermediate the ends thereof, said cut out portions providing passageways for said tray engaging means on said support arm whereby when said rotating means rotates said support arms to or from a position supporting an upper tray from or to a position beneath a lower tray, said lower tray has been indexed to a preselected intermediate position with respect to the upper tray so that said support arms can rotate through said cutout portions without engaging said tray.

2. A tray handling system according to claim 1 wherein said indexing means comprises a holding pin engageable in a series of openings in said tray to move said tray a fixed predetermined distance along said trackway.

3. A tray handling system according to claim 1 and further including guide rails mounted on said trays engageable with outer faces of said trackway for maintaining said trays in exact alignment on said trackway.

4. A method of storing a plurality of trays having support flanges and cutout portions in the support flanges and for delivering the trays sequentialy to a trackway comprising the steps of providing a storage rack filled with vertically stacked trays with the trays supported above the trackway by rotatable support arms, rotating the support arms to lower the vertically stacked trays to a position where the lowermost tray rests on the trackway with said tray in direct contact with and supporting the tray disposed thereabove, indexing the lowermost tray to a position where said lowermost tray is partially withdrawn from the storage rack with the cutout portions in the support flanges of said lowermost tray being positioned to permit the support arms to rotate through the cutout portions, and while said lowermost tray is in direct sliding contact with the tray thereabove, rotating the support arms through the cutout portions of said lowermost tray to a position where the support arms support the tray above the lowermost tray sot that it is spaced from the lowermost tray, and subsequently indexing the lowermost tray totally out of said storage rack.

5. A method of storing a plurality of trays having support flanges and cutout portions in the support flanges and for delivering a tray to a storage rack from a trackway comprising the steps of providing a storage rack filled with vertically stacked trays with the trays supported above the trackway by rotatable support arms, indexing a first tray on the trackway partially into the storage rack with the cutout portions in the support flanges of said first tray being positioned to permit the support arms to rotate through the cutout portions and with said first tray out of contact with a tray thereabove in the storage rack, rotating the support arms through the cutout portions of said first tray to a position out of engagement with the stacked trays to lower the trays to a position wherein the tray immediately above said first tray is in direct contact with the first tray, indexing the first tray completely into the storage rack while the first tray is in contact with the tray thereabove and rotating the support arms to lift the stacked trays to a position to accept a further tray indexing into the storage rack.

* * * * *